May 19, 1953 B. M. WALKER 2,639,163
SHOPPER'S CART
Filed Aug. 3, 1948 2 Sheets-Sheet 1
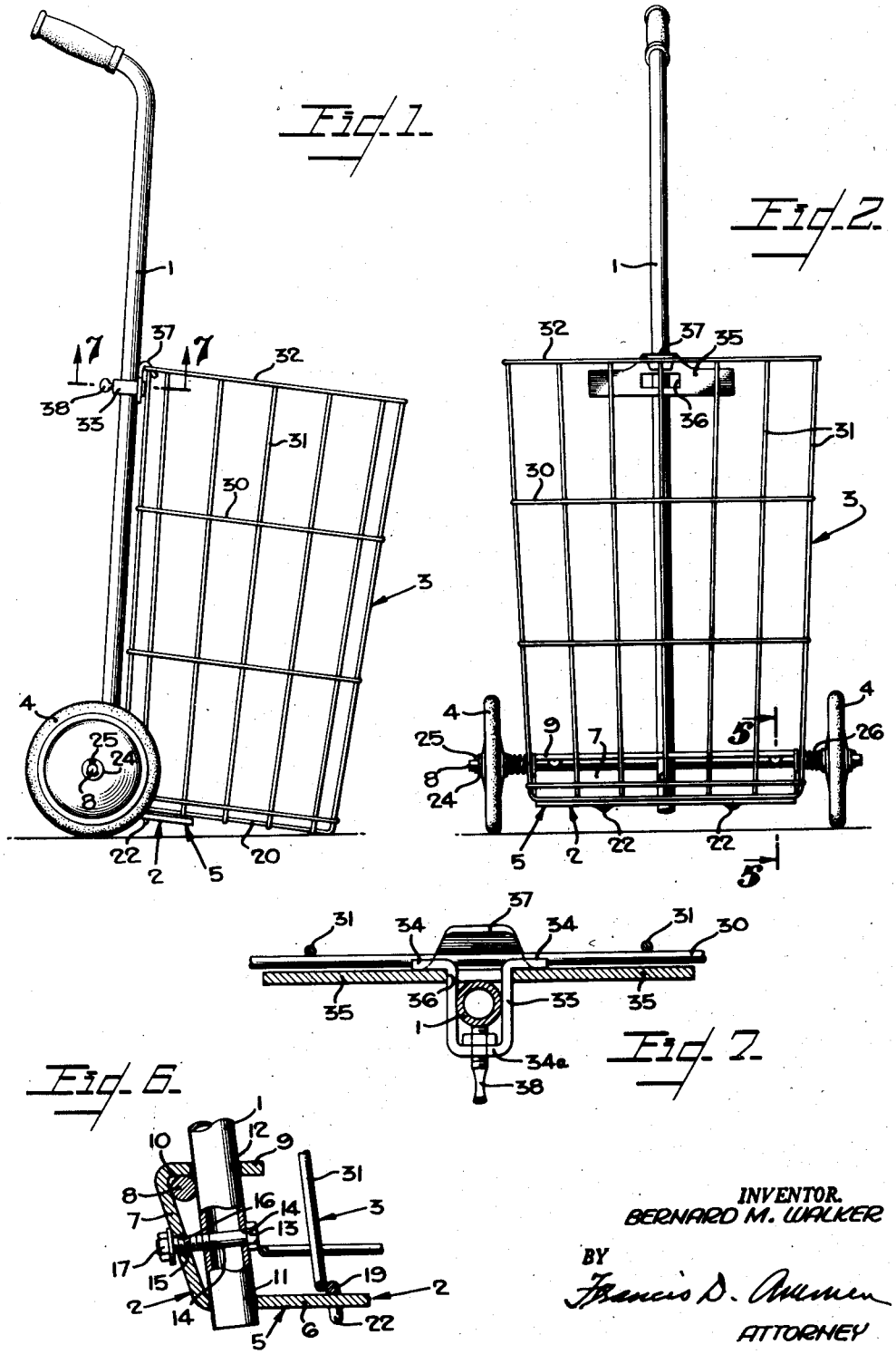
INVENTOR.
BERNARD M. WALKER
BY
ATTORNEY

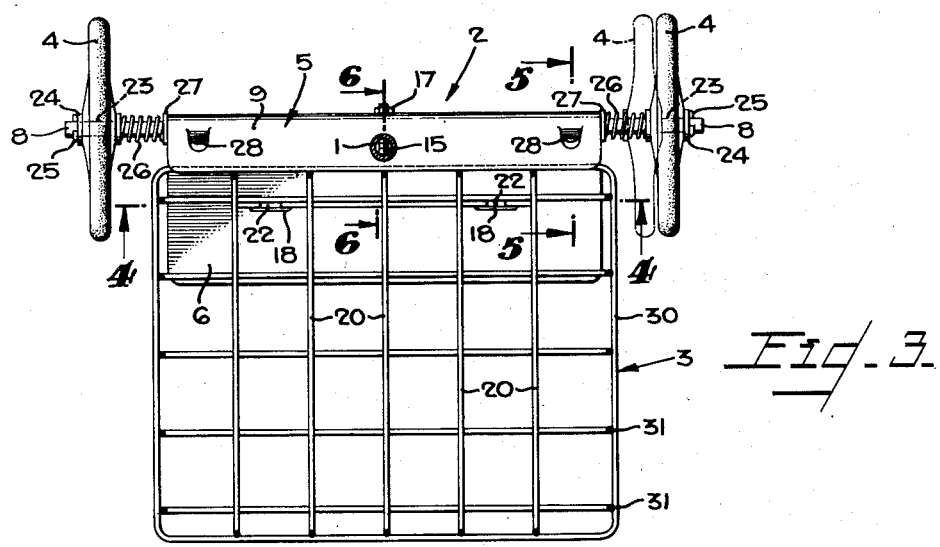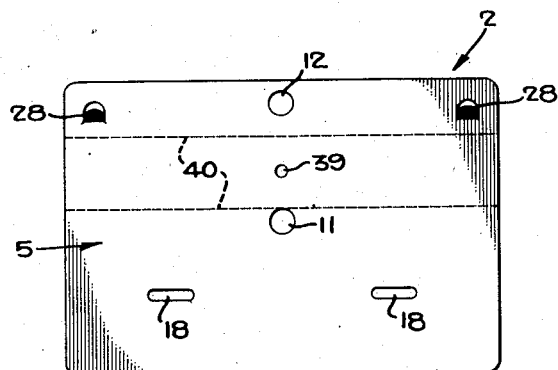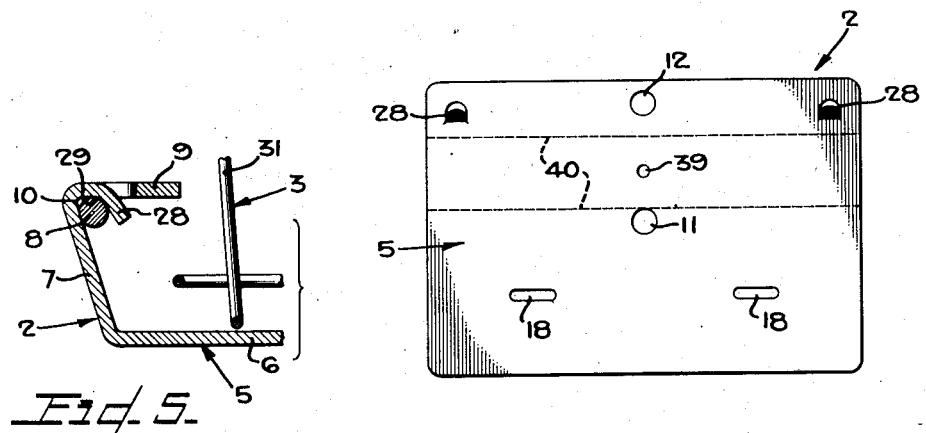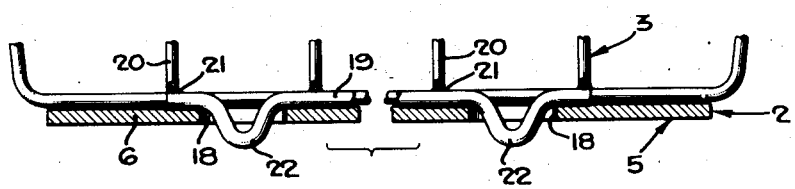

Patented May 19, 1953

2,639,163

UNITED STATES PATENT OFFICE 2,639,163

SHOPPER'S CART

Bernard M. Walker, Glendale, Calif.

Application August 3, 1948, Serial No. 42,200

9 Claims. (Cl. 280—47.26)

This invention relates to a shopper's cart, or cart such as used by persons who pass through self-service markets or the like, gathering up articles they need, which they pay for at a checker's gate.

One of the objects of the invention is to provide a serviceable cart of few parts, and of light weight, and so constructed that the holder or basket for the articles can be readily attached or detached from the frame of the cart.

In its preferred construction the cart includes a bracket that is attached to the spindle of the cart which carries its handle, and which operates as a support for the basket. One of the objects of the invention is to provide an improved construction for this bracket that will enable it to be formed if desired, as a simple stamping from sheet metal. Also to construct it so that it can be readily attached to the axle that carries the wheels of the cart, and to the spindle that carries its handle, a general purpose being to reduce the weight of material in the cart, and to reduce the cost of assembling its parts.

One of the objects is to provide a bracket having a construction enabling the same to be made from a simple blank that can be readily stamped out with dies, and formed up into the bottom bracket which is readily attachable to the axle and to the said spindle.

Shoppers usually trundle these carts home from the market, and in doing this they may, at crossings, be obliged to lift the wheels up over the curb. This lifting operation is facilitated if the wheels are shiftable inwardly at the ends of the axle, where they are mounted. One of the objects of the invention is to mount the wheels so that they can be shifted as suggested. At the same time, the fact that these wheels can be shifted is advantageous because it facilitates the application of a lubricant to the ends of the axle, which operate as journals for the wheels.

Furthermore, the yielding character of the mounting of the wheels on the axle is most advantageous when used on a cart in which the holder is detachably supported, because this feature operates to reduce the shock to the cart in moving it up onto a curb, or in letting it down from a curb. Such a shock otherwise might be the means of loosening the holder from the frame of the cart, as such holders are frequently quite heavily loaded.

To construct the frame of this cart it is unnecessary to employ more than four principal elements which include the spindle carrying the handle, the axle for the wheels, and the bottom bracket referred to. One of the objects of the invention is to provide these parts with correlated features of construction that will result in a rigid connection of the bottom bracket to the spindle and the axle, which connection is characterized by the fact that a single fastener or bolt suffices to establish this rigid connection.

Further objects of the invention will appear hereinafter.

The invention consists in the novel parts and combinations of parts to be described hereinafter, all of which contribute to produce an efficient shopper's cart.

A preferred embodiment of the invention is described in the following specification, while the broad scope of the invention is pointed out in the appended claims.

In the drawings:

Fig. 1 is a side elevation of a cart embodying this invention.

Fig. 2 is a front elevation of the cart illustrated in Fig. 1.

Fig. 3 is a plan of the cart.

Fig. 4 is a fragmentary transverse vertical section upon an enlarged scale taken about on the line 4—4 of Fig. 3 and particularly illustrating the correlated construction for the bottom bracket and the article holder that prevents the holder from shifting off the bracket when supported on it. The middle portion of this view is broken away.

Fig. 5 is a fragmentary vertical section upon an enlarged scale, taken about on the line 5—5 of Fig. 2, and Fig. 3.

Fig. 6 is a fragmentary vertical section on the line 6—6 of Fig. 3 upon an enlarged scale, particularly illustrating the connection between the bottom bracket, the spindle, and the axle.

Fig. 7 is a fragmentary section upon an enlarged scale taken on the line 7—7 of Fig. 1, illustrating the means for securing the upper end of the holder to the spindle. This view is also upon an enlarged scale.

Fig. 8 is a plan of a blank of my invention capable of being readily formed up to produce the bottom bracket.

In constructing the frame, I employ a single bar or spindle 1, and adjacent the lower end of this spindle I attach a bottom bracket 2, the function of which is to support a holder 3 which, in the present instance, is in the form of a basket constructed of wire.

My invention is particularly concerned with the mounting for the wheels 4, 4 on which the frame of the cart is mounted, and with correlated features of construction of the bottom bracket and the other parts which facilitate making the connection of the bottom bracket to the spindle, and providing the support for the holder 3 on the bottom bracket that will prevent the holder from shifting off of the bracket. The preferred construction of the bottom bracket 2 is illustrated in detail in Figs. 5 to 8, inclusive. This bracket is preferably formed from a blank 5 of plate material, which is of sufficiently small gauge to facilitate its being bent up substantially into the shape illustrated in Fig. 6, that is to say, this bracket has a bottom shelf 6 (see Figs. 5 and 6) that projects forwardly in a substantially horizontal position from the body portion 7 of this bracket. The body portion of the bracket lies alongside of the lower portion of the spindle 1 when the bracket is attached to the spindle, and in order to accomplish this, and at the same time secure the axle 8 of the cart to the bracket and the spindle, I prefer to provide the bracket with an upper integral flange 9 (see Fig. 6). The bracket is formed so that the body portion 7 inclines away from the side of the spindle 1 in an upward direction, and consequently, the flange 9 forms an acute angle 10, which operates as a socket for the axle as illustrated in Fig. 6. The flanges 6 and 9 have two aligning openings 11 and 12, respectively, which receive the lower end of the spindle inserted from above. By reason of these features of construction, I am enabled to secure these three parts, the spindle, the bracket, and the axle, rigidly together by employing a single fastener means such as a bolt 13. This bolt is received in a diametrical opening 14 that is drilled through the spindle in the front and rear plane or axis of the cart. This bolt is inserted from the front, and its threaded shank 15 projects through an opening 16 that has already been punched in the body portion 7 of the bracket. With this construction it will be evident that when the nut 17 on the end of the bolt is tightened up, it will clamp the parts rigidly together.

In order to prevent the holder 3 from shifting after it has been seated on the upper side of the flange 6, I prefer to provide an interlocking connection between the flange and the holder. In the present instance, this is accomplished by providing two aligned openings or slots 18 in the flange 6, which are disposed equidistant from the medial front and rear plane of the cart; and the under side of the holder 3 is provided with lugs or projections that project down into these slots. If a wire basket such as illustrated is employed, this is accomplished by providing a lug bar 19 that is welded to the bottom bars or wires 20 of the wire-holder at the points 21 where this lug bar rests against them. This bar 19 is provided with downward offsets or bights 22 that project down into the slots.

In order to prevent imparting any shock to articles carried in the holder if one of the wheels should strike on its outer side against an obstruction such as a curb, or any object in the way of the cart when it is being trundled through a market, I prefer to mount the wheels 4 so that they are held yieldingly in their normal position in which they are illustrated in full lines in Fig. 3.

The hubs of the wheels have openings through them which fit neatly on their journals 23 at the ends of the axle. On its outboard sides the hubs of each of these wheels thrust against a washer 24 which seats against a split pin 25 or the like, mounted in the projecting end of the axle, and a coil spring 26 mounted on the axle between each wheel and the end of the bottom bracket 2, holds the wheels normally in their maximum spread position. The inboard end of each coil spring may thrust against a washer 27 that seats against the adjacent end of the bottom bracket.

In order to secure the ends of the axle 8 to the outer portions of the bracket plate, I prefer to provide the flange 9 with two retainers 28 that are struck down from the material of the flange so as to assume a downwardly inclined position. These tongues are located near the body portion 7 of the bracket so that they co-operate with the body portion to form a socket 29 at each tongue (see Fig. 5), to receive the axle and hold it in a horizontal position. In performing this function they co-operate with the rigid connection illustrated in Fig. 6.

Any suitable means may be provided for securing the upper end of the holder to the spindle 1 at a higher level than the bottom bracket. This means may be located so as to engage an intermediate girt 30 that encompasses the vertical side bars 31 of the wire basket, but in the present instance it is illustrated as engaging the uppermost girt or top girt 32. In the present instance, the means for making this connection may include a U-shaped saddle 33 (see Fig. 7) the forks of which are bent laterally outwardly to form fingers 34 that seat against the adjacent face of a saddle plate 35. This saddle plate is shown in section in Fig. 7, and is provided at its middle portion with a slot 36 through which the body of the saddle 33 is introduced from the forward side. The upper edge of the saddle plate has an integral tongue that is bent down to form a hook 37 that engages over the top girt 32 of the wire basket.

A set screw 38 is mounted in the cross-bar 34a of the saddle or shackle 33. When this set screw is tightened up against the spindle 1, the fingers 34 are pulled back forcibly against the saddle plate 35.

The blank 5 is preferably stamped out from sheet metal of suitable gauge, and is then punched to form the openings 11 and 12, the slots 18 and the opening 39 which is afterward threaded for the set screw 38. The blank is then bent at the location of the dotted lines 40 to form the flanges 6 and 9.

Many other embodiments of the invention may be resorted to without departing from the spirit of the invention.

I claim as my invention:

1. In a shopper's cart or the like, having a holder for articles purchased, the combination of a substantially upright spindle, an axle with wheels, extending transversely to said spindle, a bracket plate for supporting the holder, having a body with integral extensions at different levels, said extensions having sockets receiving said spindle, means for securing said bracket and said axle to said spindle, said bracket having an axle retainer struck from the material thereof forming a socket engaging said axle at a location disposed laterally with respect to said spindle, and means on the spindle at a higher level for engaging the holder to assist in securing the same.

2. A shopper's cart according to claim 1, which is provided with two of said axle retainers disposed respectively adjacent the ends of said axle, and each including a tongue struck from the material of said bracket.

3. A shopper's cart according to claim 1, in which the said bracket includes a shelf extension to project under the holder, and having socket means to cooperate with the holder to keep the same from shifting off said shelf extension.

4. A shopper's cart according to claim 1, including a holder in the form of a basket, and in which the bracket includes a shelf extension projecting under the basket, with sockets therein, said basket having integral lugs projecting down into said last named sockets to hold the basket against shifting.

5. In a shopper's cart or the like having a holder for the articles purchased, the combination of a spindle, a bottom bracket having a body with a pair of flanges located at different levels, and disposed in planes extending transversely to the axis of the spindle, said flanges having sockets therein receiving the spindle, an axle extending transversely to said spindle disposed in the angle between one of said flanges and the body of the bracket, and fastener means for securing the bracket to the spindle and the axle in the said angle.

6. In a shopper's cart or the like, the combination of a bottom bracket for supporting the holder for the articles purchased, comprising a plate with flanges at different levels with aligning sockets, a spindle in said sockets, said plate having a body connecting said flanges and lying alongside said spindle, an axle lying in the angle between the upper flange and said body, and fastener means for securing the bracket to the spindle and for clamping the axle in the said angle in which it lies.

7. A bracket plate for supporting the lower end of a shopper's article-holder, having a body with a bottom flange projecting outwardly and forwardly therefrom adapted to project under the holder, and having a pair of sockets formed therein located respectively on opposite sides of a medial geometric axis of the plate, and adapted to be engaged by projections extending down from the under side of the said holder, said bracket plate further having an upper flange projecting over the said bottom flange and having a pair of downwardly projecting tongues struck from the material thereof, the body portion of said plate connecting said flanges co-operating with the said tongues to form sockets, said tongues being located toward the ends of said bracket plate; said flanges having openings therethrough in alignment with each other to receive a spindle.

8. A blank to be formed into a bracket plate as claimed in claim 7, comprising a substantially rectangular plate having a pair of openings therein aligning with each other on a medial geometric axis of the plate, one of said openings being disposed adjacent to one of the edges of said plate to receive the handle of the article holder, said plate further having a pair of integral tongues struck therefrom and projecting in a direction inclined to the plane of the plate, and toward the last named edge, so as to cooperate with a portion of the completed bent bracket to form sockets capable of retaining the bracket on the axle.

9. A blank to be formed into a bracket plate as claimed in claim 7, comprising a substantially rectangular plate having a pair of openings therein aligning with each other on a medial geometric axis of the plate, one of said openings being disposed adjacent to one of the edges of said plate to receive the handle of the article holder, said plate further having a pair of integral tongues struck therefrom and projecting in a direction inclined to the plane of the plate, and towards the last named edge, so as to cooperate with a portion of the completed bent bracket to form sockets capable of retaining the bracket on the axle, said blank further having a pair of aligned slots located on opposite sides of said medial axis to receive downward extensions from the holder and secure it against shifting off of the bracket.

BERNARD M. WALKER.

References Cited in the file of this patent

UNITED STATES PATENTS

| Number | Name | Date |
|--------|------|------|
| 1,501,280 | Hinshaw | July 15, 1924 |
| 2,054,703 | Little | Sept. 15, 1936 |
| 2,415,334 | Brown | Feb. 4, 1947 |
| 2,425,107 | Martin | Aug. 5, 1947 |